April 5, 1938.    J. H. BOOTH    2,112,878
HINGE
Original Filed Nov. 8, 1934

John Holt Booth
INVENTOR:
By *Otto Munk*
his ATTY.

Patented Apr. 5, 1938

2,112,878

UNITED STATES PATENT OFFICE 2,112,878

HINGE

John Holt Booth, Four Oaks, Sutton Coldfield, England, assignor of one-third to Arthur Sam Cheston and one-third to Herbert Linwood Sleigh, both of Birmingham, England Original application November 8, 1934, Serial No. 751,973. Divided and this application May 2, 1936, Serial No. 77,568. In Great Britain November 18, 1933

8 Claims. (Cl. 16—128.1)

This invention relates to long hinges of the kind used in certain sheet metal structures, for example, the hinges employed for the plates of bonnet coverings for the engine of a motor vehicle, or the hinges for attaching the covers of dickey seats to vehicles or for attaching the hinged lids of luggage containers.

Hinges of this kind are commonly applied to plates having a painted or enamelled finished surface, and such surface commonly becomes scratched or damaged after a period of use due to abrasion between contacting metal parts when one of the plates is moved or opened, and the present invention provides a construction in which scratching or damage to such enamelled or painted surface is reduced or eliminated.

The subject-matter of this present application is divided from my original patent application, serially numbered 751,973 and filed on 8th November, 1934.

Referring to the drawing:—

Figure 1:
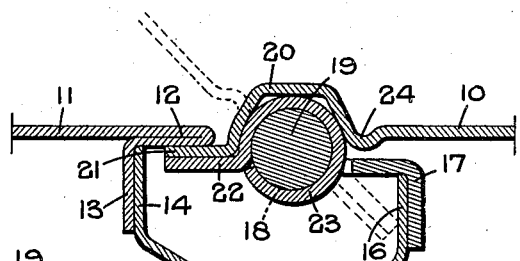
Figure 1 is a sectional end elevation of a bonnet hinge of an automobile vehicle and constructed in accordance with this invention.

In the construction illustrated in Figure 1 the hinge is adapted for connecting bonnet plates of the engine of a motor vehicle comprising primary and secondary plates 10 and 11 respectively, the latter plate being turned upon itself at the edge to be hinged forming an edge 12 of double thickness and with a downwardly bent portion 13 substantially at right angles to the plane of the main portion of the plate.

One side 14 of a channel 15 is secured to the downwardly projecting portion 13 and to the opposite side 16 of the channel are secured angle brackets 17 each of which is secured at one limb to the side 16 whilst the other limb projects inwardly across the open top of the channel.

Each bracket 17 is formed at the free edge of the inwardly projecting arm with a loop or angle 18 for engagement with the hinge pin 19.

The primary plate adjacent the edge to be hinged is pressed to form an integral cover plate or portion 20 of inverted channel form with a substantially flat top and substantially flat sides inclined with respect to one another and to the top portion of the channel.

Along the projecting edge of the cover plate or portion 20 is a longitudinal wing 21 to which are attached flanges 22 of hinging loops or knuckles 23 adapted for pivoting the primary plate upon the pin 19.

The loops or knuckles 23 are arranged at spaced intervals along the length of the pin and the loops 18 are disposed within the spaces between these loops 23.

The knuckles 23 serve to space the cover portion 20 from the hinge pin and the plate 11 moves to the open position by turning the loops or knuckles 18 around the pin 19 whilst the plate 10 moves or hinges by turning the loops or knuckles 23 around the pin 19.

The plate 10 can be hinged to the position shown in dotted lines in which the flanges 22 contact with the inner face of the side 16 of the channel and similarly the hinging movement of the plate 11 is stopped when the side 16 engages the underside of the flanges 22.

A gutter or channel 24 is formed at the junction of the cover portion 20 and the plate 10 to balance the groove on the opposite side between the cover portion and the double edge 12 to improve the appearance of the hinge.

Figure 2:
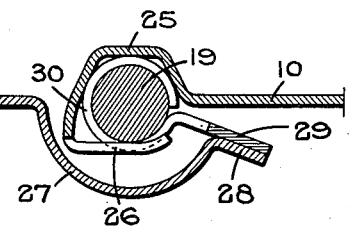
Figure 2 is a section through a further modification.
Figure 3:
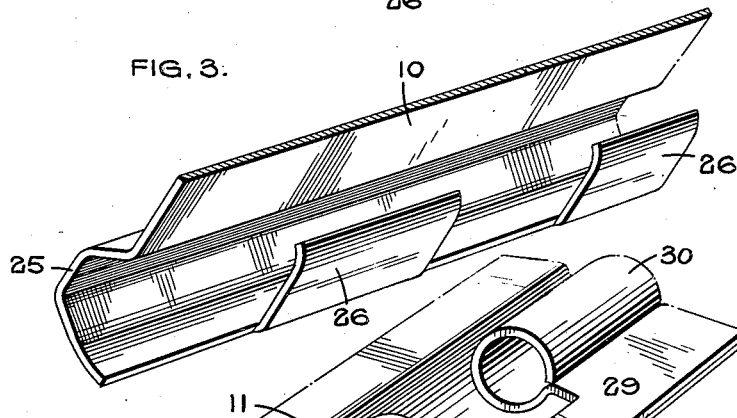
Figure 3 shows in perspective one of the plates of the construction illustrated in Figure 2.
Figure 4:
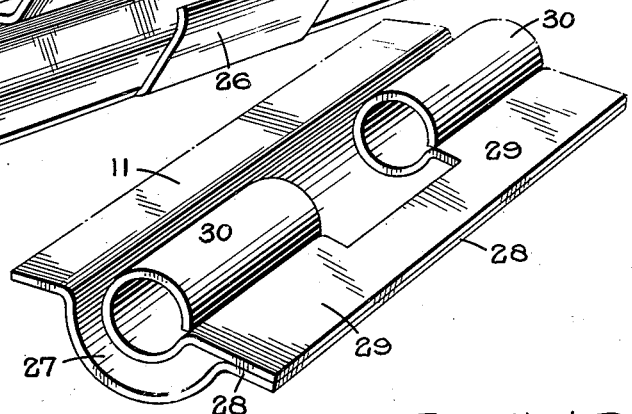
Figure 4 is a perspective view of the other plate of the construction shown in Figure 2.

In the modification illustrated in Figures 2 to 4, the primary plate 10 is formed integrally with the cover plate or portion 25 provided with a flat top and substantially flat side portions and the plate 10 is retained upon the pin 19 by means of tongues or portions 26 bent to embrace the underside of the pin.

The secondary plate 11 is formed with an integral channel 27 of part circular section, the projecting edge of which is bent outwardly at 28 to form a flange to which is secured a flange 29 carrying the loops or knuckles 30.

The flange 29 is continuous along the length of the hinge and the loops 30 are provided at spaced positions to allow the tongues 26 to engage with the underside of the pin 19 in the spaces between these loops 30.

The loops 30 space the cover portion 25 from the pin 19 whilst the tongues 26 prevent the cover portion rising or moving out of position in use.

Figure 5:
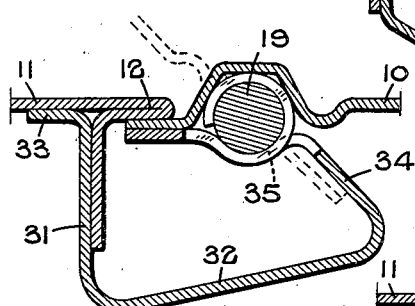
Figure 5 is a sectional elevation of a slight modification of Figure 1.

In the modification illustrated in Figure 5, the construction is identical in principle with that illustrated in Figure 1 and one side 31 of a channel 32 is secured to the downwardly projecting portion 13 of the secondary plate 11 whilst a lateral flange 33 on the edge of the side 31 is secured to the underside of the plate 11.

The other side 34 of the channel 32 is slotted to form a plurality of spaced tongues which are subsequently bent into loop-like form at 35 for engagement with the hinge pin 19.

The side 34 of the channel 32 forms a stop for the primary plate by engagement with the flanges 22 as shown in dotted lines and the inclination of the side 34 is such that the primary plate 10 can be moved through an angle of about 135 degrees from the closed position shown in full lines, to the open position shown in dotted lines.

The flanges 22 engage with the side 34 with the face fitting along the entire length of the hinge and the opening movement of the primary plate is stopped in an efficient manner. When the secondary plate is moved to the open position the channel 32 moves relative to the pin 19 and opening movement of the secondary plate is arrested when the side 34 of the channel engages the underside of the flanges 22.

In all the constructions described above the cover plate or portion is of inverted channel shape and the sides of the channel are supported from the hinge pin so that the cover plate is strengthened and stiffened against distortion or bending in use.

The cover plate seats upon the knuckles engaging the hinge pin and is supported along its length and along a plurality of lines which are spaced angularly around the peripheries of the loops so that distortion of the cover plate due to localized support is eliminated.

In addition the cover plate is supported across its width without causing excessive frictional contact between the cover plate and the loops of the hinge plates so that the latter can be moved around the pin without considerable friction between the loops and the cover plate although the sides of the cover plate are supported and reinforced.

The support of the cover plate along a plurality of spaced lines disposed angularly around the periphery of the hinge pin prevents the cover plate moving laterally with respect to the hinge pin in a downward direction, and in the constructions in which the cover plate has portions engaging beneath the hinge pin, movement of the cover plate laterally in an upward direction is also prevented.

In all the constructions sufficient clearance is provided between the cover plate and portions of the hinge adapted to move around the cover plate so that scratching or damage of the exposed surface of the hinge, and particularly the upper surface of the cover plate, is prevented.

If there is any frictional or rubbing contact between the cover plate and any parts of the hinge which are moved with respect to the cover plate when the hinge is in use, the painted or polished finish of the cover plate becomes damaged and the appearance of the hinge is impaired.

The invention has been described as applied to the plates of bonnet coverings for the engine of a motor vehicle, but it will be appreciated that it may also be applied to the hinges for attaching the covers of dickey seats to vehicles, or for attaching the hinged lids of luggage containers, or for any other application in which it is desired to provide a long substantially continuous hinge and weather protection is needed to prevent water or the like passing between the joints in the hinge.

What I claim then is:—

1. A hinge including a hinge pin, a primary hinge plate, a cover plate integral with one edge of said primary hinge plate, said cover plate extending along said pin in spaced relationship therewith, parts on said cover plate engaging said pin, a secondary hinge plate, parts on said secondary plate engaging said pin, each of said hinge plates being capable of opening movement on said pin, said cover plate being of inverted channel section, and covering the parts on both hinge plates engaging said pin and covering the joints between said parts, and the sides of the channel being supported from the hinge pin along the length of the cover plate to provide reinforcement for said cover plate.

2. A hinge including a hinge pin, a primary hinge plate, a cover plate integral with one edge of said primary hinge plate, said cover plate extending along said pin in spaced relationship therewith, parts on said cover plate engaging said pin, a secondary hinge plate, parts on said secondary plate engaging said pin, each of said hinge plates being capable of opening movement on said pin, said cover plate being of inverted channel section, and the sides of the channel being supported from the hinge pin along the length of the cover plate to provide reinforcement for said cover plate, and a laterally projecting wing on the projecting edge of said cover plate, said wing being adapted to overlap an edge portion of said secondary plate.

3. A hinge including a hinge pin, a primary hinge plate, a cover plate integral with one edge of said primary hinge plate, said cover plate extending along said pin in spaced relationship therewith, a laterally projecting wing on the projecting edge of said cover plate, a strip attached to said wing, arcuate parts on said strip engaging said pin, a secondary hinge plate, parts of said secondary plate engaging said pin, each of said hinge plates being capable of opening movement on said pin, said cover plate being of inverted channel section with a flattened top and flattened sides extending downwardly from said top, the sides of the channel being supported from the hinge pin along the length of the cover plate to provide reinforcement therefor and an edge portion on said secondary plate adapted to overlap said wing at the edge of the cover plate when the hinge is in the closed position.

4. A hinge including a hinge pin, a primary hinge plate, a cover plate integral with one edge of said primary hinge plate, said cover plate extending along said pin in spaced relationship therewith, arcuate parts engaging said pin, attachment portions on said arcuate parts, means for securing said attachment portions to said cover plate, said cover plate having a flattened top resting on said arcuate parts, a secondary hinge plate, further arcuate parts engaging said pin, attachment portions on said arcuate parts, each of said hinge plates being capable of opening movement on said pin, said cover plate being of inverted channel section and covering the arcuate parts associated with both hinge plates and covering the joints between such arcuate parts and means for securing said attachment portions to said plate.

5. A hinge including a hinge pin, a primary hinge plate, a cover plate integral with one edge of said primary hinge plate, said cover plate extending along said pin in spaced relationship therewith, arcuate parts engaging said pin, attachment portions on said arcuate parts, means for securing said attachment portions to said cover plate, a secondary hinge plate, further arcuate parts engaging said pin, attachment portions on said arcuate parts, means for securing said attachment portions to said plate, each of said hinge plates being capable of opening movement on said pin, said cover plate being of inverted channel form with a top supported from some of said arcuate parts and sides extending downwardly from said top, said sides being supported from some of said arcuate parts along the length of the cover plate and a laterally projecting wing at the projecting edge of said cover plate, said wing being adapted to overlap an edge portion of said secondary plate.

6. A hinge including a hinge pin, a primary hinge plate, a cover plate integral with one edge of said primary hinge plate, said cover plate extending along said pin in spaced relationship therewith, arcuate parts engaging said pin, attachment portions on said arcuate parts, means for securing said attachment portions to said cover plate, a secondary hinge plate, further arcuate parts engaging said pin, attachment portions on said arcuate parts, each of said hinge plates being capable of opening movement on said pin, said cover plate being of inverted channel form with a flattened top supported from some of said arcuate parts and flattened sides extending downwardly from said top, said sides being supported from some of said arcuate parts along the length of the hinge and a channel disposed beneath said pin and secured at one side to said secondary plate and at the other side to the attachment portions associated with said secondary plate.

7. A hinge including a hinge pin, a primary hinge plate, a cover plate integral with one edge of said primary hinge plate, said cover plate extending along said pin in spaced relationship therewith, arcuate parts engaging said pin, attachment portions on said arcuate parts, means for securing said attachment portions to said cover plate, a secondary hinge plate, further arcuate parts engaging said pin, attachment portions on said arcuate parts, a laterally projecting wing on the projecting edge of said cover plate, an edge portion on said secondary plate adapted to overlap said wing when the hinge is in the closed position, each of said hinge plates being capable of opening movement on said pin, said cover plate being of inverted channel form and the sides of said channel being supported on some of said arcuate parts, and a channel disposed beneath said pin, one side of said channel being secured to said secondary plate and the attachment portions associated with said secondary plate being secured to the other side of said channel.

8. A hinge including a hinge pin, a primary hinge plate, a cover plate integral with one edge of said primary hinge plate, said cover plate extending along said pin in spaced relationship therewith, arcuate parts engaging said pin, attachment portions on said arcuate parts, means for securing said attachment portions to said cover plate, a secondary hinge plate, further arcuate parts engaging said pin, attachment portions on said arcuate parts, each of said hinge plates being capable of opening movement on said pin, said cover plate being of inverted channel form and the sides of said channel being supported on some of said arcuate parts, a doubled edge on said secondary plate, a downwardly projecting flange on said doubled edge, a channel disposed beneath said pin, the attachment portions associated with said secondary plate being secured to one side of said channel, the other side of said channel being secured to said downwardly projecting flange and an integral laterally projecting wing extending along the projecting edge of said cover plate, said wing being adapted to overlap said doubled edge on said secondary plate when the hinge is in the closed position.

JOHN HOLT BOOTH.